(12) United States Patent
Stephenson

(10) Patent No.: US 10,957,473 B2
(45) Date of Patent: Mar. 23, 2021

(54) DUAL WINDING SUPERCONDUCTING MAGNETIC ENERGY STORAGE

(71) Applicant: Hamilton Sundstrand Corporation, Charlotte, NC (US)

(72) Inventor: Gary Van Stephenson, Houston, TX (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 242 days.

(21) Appl. No.: 16/179,430

(22) Filed: Nov. 2, 2018

(65) Prior Publication Data

US 2020/0143968 A1    May 7, 2020

(51) Int. Cl.
*H01F 7/00* (2006.01)
*H01F 6/06* (2006.01)
*H01F 6/00* (2006.01)

(52) U.S. Cl.
CPC ............... *H01F 6/06* (2013.01); *H01F 6/008* (2013.01)

(58) Field of Classification Search
CPC ............. H01F 6/06; H01F 6/006; H01F 6/008
USPC .......................................................... 335/216
See application file for complete search history.

(56) References Cited

U.S. PATENT DOCUMENTS

| | | | | |
|---|---|---|---|---|
| 4,437,080 A | * | 3/1984 | Ekin | H01F 6/06 174/125.1 |
| 4,622,531 A | | 11/1986 | Eyssa et al. | |
| 4,814,731 A | * | 3/1989 | Sato | H01F 6/06 242/437.3 |
| 4,857,675 A | * | 8/1989 | Marancik | H01F 6/06 174/15.4 |
| 5,159,261 A | | 10/1992 | Kim et al. | |
| 5,160,911 A | * | 11/1992 | Herring | H02J 15/00 335/216 |

(Continued)

FOREIGN PATENT DOCUMENTS

| | | |
|---|---|---|
| WO | 2017029676 A1 | 2/2017 |
| WO | 2018183579 A1 | 10/2018 |

OTHER PUBLICATIONS

Forward, Robert L. "Guidelines to Anti-Gravity", Proceedings of the Gracity Research Foundation, 1962, pp. 1-9.

(Continued)

*Primary Examiner* — Shawki S Ismail
*Assistant Examiner* — Lisa N Homza
(74) *Attorney, Agent, or Firm* — Cantor Colburn LLP

(57) ABSTRACT

A superconducting magnetic energy storage system (SMES). The SMES includes a toroidally wound super conducting magnet having a toroidal magnetic core with a charging winding and a discharging winding. The charging winding and discharging winding are wound on the toroidal magnetic core. The SMES also includes a DC power source, the DC power source operable to provide DC current to the charging winding of the toroidally wound superconducting magnet, and a modulator operably connected to the DC power source and the charging winding, the modulator operable to modulate at least a portion of the DC current applied to the charging winding of the superconducting magnet. The energy is stored in a magnetic field of the superconducting magnet by applying a current to the charging winding of the superconducting magnet, and energy is withdrawn from the magnetic field by a current flowing in the discharging winding.

13 Claims, 7 Drawing Sheets

(56) References Cited

U.S. PATENT DOCUMENTS

| | | | | |
|---|---|---|---|---|
| 5,289,150 | A * | 2/1994 | Rabinowitz | H01F 6/008 310/52 |
| 5,339,062 | A | 8/1994 | Donaldson et al. | |
| 5,473,301 | A * | 12/1995 | Hall | H02J 15/00 335/216 |
| 5,523,914 | A * | 6/1996 | Weck | H01F 6/006 323/360 |
| 5,532,664 | A | 7/1996 | Buckles et al. | |
| 6,054,913 | A * | 4/2000 | Leuer | H01F 6/00 335/299 |
| 6,194,985 | B1 * | 2/2001 | Tanaka | H01F 6/06 174/125.1 |
| 6,222,434 | B1 * | 4/2001 | Nick | H01F 6/003 335/216 |
| 6,498,464 | B1 | 12/2002 | Doht et al. | |
| 6,897,749 | B2 * | 5/2005 | Jonsson | H02J 15/00 335/216 |
| 2003/0169142 | A1 * | 9/2003 | Vicci | H01F 7/20 336/178 |
| 2010/0323900 | A1 * | 12/2010 | Kawashima | H01F 6/065 505/211 |
| 2011/0304416 | A1 * | 12/2011 | Warner | G01R 33/3815 335/216 |
| 2015/0357104 | A1 * | 12/2015 | Radovinsky | H02J 15/00 335/216 |
| 2016/0042841 | A1 * | 2/2016 | Rodriguez Zermeno | H01B 12/02 505/211 |
| 2016/0111192 | A1 * | 4/2016 | Suzara | A61B 34/30 335/301 |
| 2016/0163439 | A1 * | 6/2016 | Pourrahimi | H01F 6/04 62/51.1 |
| 2017/0236600 | A1 * | 8/2017 | Kingham | H05H 1/12 376/137 |
| 2017/0358386 | A1 * | 12/2017 | Armstrong | H01F 6/006 |
| 2018/0204671 | A1 * | 7/2018 | Arndt | H01F 27/08 |
| 2018/0330857 | A1 * | 11/2018 | Radovinsky | H01F 6/06 |
| 2019/0013724 | A1 * | 1/2019 | Senderos | H01F 6/04 |
| 2020/0168349 | A1 * | 5/2020 | Hampshire | H01F 6/065 |

OTHER PUBLICATIONS

Hyperphysics "Inductance of a coil of wire", pp. 1-2, retrieved Oct. 9, 2020, retrieved from http://hyperphysics.phy-astr.gsu.edu/hbase/magnetic/indcur.html.

Hyperphysics "Toroidal Magnetic Field", pp. 1-2, retrieved Oct. 9, 2020, retrieved from http://hyperphysics.phy-astr.gsu.edu/hbase/magnetic/toroid.html.

Metglas "Magnetic Alloy 2714A (cobalt-based)", Technical Bulletin, Metglas.com, 2012, pp. 1-4.

Ness Engineering Inc. "Inductance Formulas", pp. 1-3, retrieved Oct. 9, 2020, retrieved from http://www.nessengr.com/technical-data/inductance-formulas/.

Rieken et al., "YBa2Cu3Ox superconducting nanorods", Japanese Journal of Applied Physics, 2018, pp. 1-5.

True 2 Materials "Applying frontier nanoscale know-how and materials to solve commerical and environmental challenges at scale", pp. 1-5, retrieved Oct. 9, 2020, retreived from http://www.true2materials.com/.

Wikipedia "Circle packing", pp. 1-3, retrieved Oct. 9, 2020, retrieved from https://en.wikipedia.org/wiki/Circle_packing.

Wikipedia "Lorentz force", pp. 1-10, retrieved Oct. 9, 2020, retrieved from https://en.wikipedia.org/wiki/Lorentz_force.

Wikipedia "Superconducting magnetic energy storage", pp. 1-3, retrieved Oct. 9, 2020, retrieved from https://en.wikipedia.org/wiki/Superconducting_magnetic_energy_storage.

European Search Report for Application No. 19206489.7, dated Mar. 26, 2020, 6 pages.

Pascal Tixador: "Superconducting Magnetic Energy Storage: Status and Perspective", Jan. 3, 2008, Retrieved from the internet: URL:https://snf.ieeecsc.org/sites/ieeecsc.org/files/CR5_Final3_012008.pdf, 14 pages.

* cited by examiner

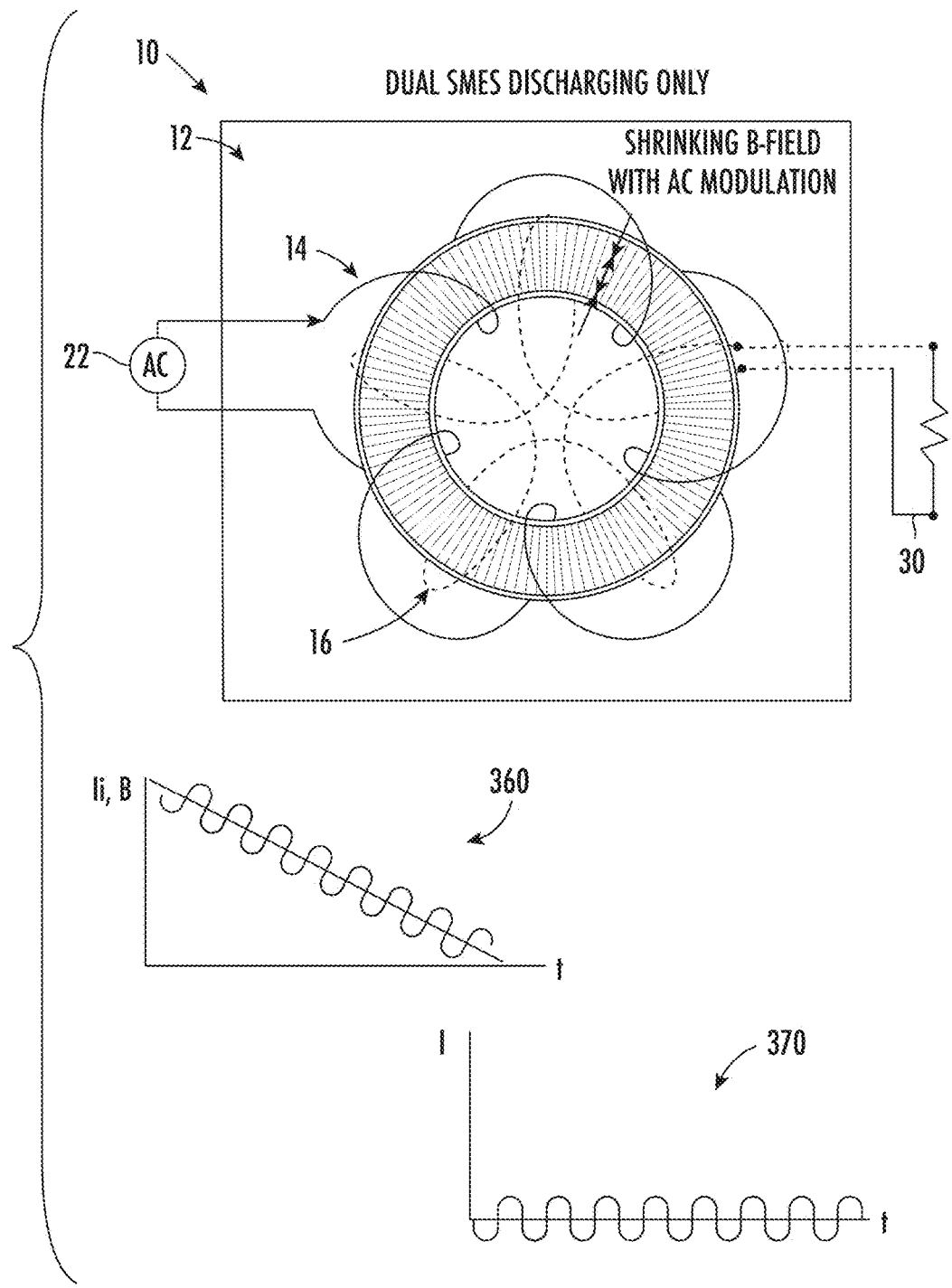

DUAL WINDING SUPERCONDUCTING MAGNETIC ENERGY STORAGE

BACKGROUND

Exemplary embodiments pertain to the art of a superconducting magnetic energy storage (SMES) device. More particularly, a SMES device with separated tightly coupled windings for charging and discharging wound in a toroidal fashion such that the magnetic field is largely contained within the bore of the magnet, thus producing a very low external field.

Superconducting magnetic energy storage devices have a number of advantages as storage devices. Electrical current is the input, output, and stored medium, which allows for complete solid-state energy conversion. The electromagnetic coils themselves have no moving parts. Round-trip efficiency is higher than for batteries, compressed air, or pumped hydro. Output power can be very high, allowing complete discharge of the unit within a few seconds. Finally, SMES devices can be designed for a very large number of cycles, limited essentially by fatigue in the structural components and material lifetimes.

In a SMES device, energy is stored in the form of a magnetic field generated by a coil made of superconducting material where a superconducting current circulates. The stored energy is $\frac{1}{2}LI^2$ where L is the inductance of the coil and I is the current circulating in the coil. Since the coil is superconducting, very small losses are present and the storage time is very long. When energy is required, the current can be redirected and the energy stored in the coil is transferred to work in the coil. Two types of electromagnetic coils have been considered for SMES: the solenoid, a circular loop of conductor; and the toroid, in which the circular or D-shaped coils are arranged in a circle to produce a doughnut-shaped field. A solenoid produces a magnetic field, B, which is external of the magnet, whereas a toroid produces a magnetic field that is contained primarily within the magnet's bore. However toroidal magnets have several advantages. First, because the magnetic field is closed within the bore of the magnet, the external field is very small. Generally, the external field is a product only of the toroid being composed of several individual coils. Leads and winding irregularities also produce small external fields. As a result, in many applications, such a mobile applications, a toroidal electromagnet may be more appropriate. Additionally, a toroidal SMES can be composed of several individual coils which would be fabricated and tested in a factory, transported by truck or rail to the site, and placed to form a circular arrangement.

Most, if not all, of the present day solutions for charging and discharging a SMES are based on redirecting the current into or out of the coil using switching devices. Generally the switching devices are electromechanical or semiconductor devices or a combination of both and can either be placed in the cooling medium conventionally known as a dewar that cools the superconducting coil or placed outside the cooling medium, e.g. at room temperature. However, in both cases, the direction and redirection of current into the SMES device to charge it and out of the SMES device is based on the principle of breaking the superconducting circuit to force the current to flow in a path through the load. In particular, in such known devices, the device user is forced to choose between a charging mode and a discharging mode, without the ability to perform both operations simultaneously.

Magnetic energy storage units have many applications for short term, high instantaneous power applications, an example of which is a buffer for the kinetic energy of an automobile, bus, or railcar. For example, about 30 kW of power is required to comfortably accelerate a small automobile into traffic, yet only about 8.5 kW is required to maintain the automobile at 55 mph on level pavement. Therefore, an automobile engine spends most of its time operating relatively inefficiently. Additionally, the present internal combustion engine does not allow for regenerative braking. Although battery-powered automobiles have certain advantages to offset the problems of the internal combustion powered automobile, they are often hampered by limitations on instantaneous current. Battery lifetime is limited by the total number of cycles. One possible way to circumvent these difficulties is to use a short-term, high specific power energy storage device.

BRIEF DESCRIPTION

Disclosed herein is a dual winding superconducting magnetic energy storage system (SMES). In addition to storing magnetic energy by means of a DC current flowing in a toroid electromagnet, a portion of the power may be coupled from one coil (charging) winding to the other (discharging) winding via AC modulation of a portion of the input charging loop current.

Also disclosed is an SMES design that includes a toroidally wound super conducting electromagnet having a charging winding, a discharging winding, and a toroidal magnetic core. The charging winding and discharging winding are wound on the toroidal magnetic core. The SMES is charged by a DC power source, the DC power source operable to provide DC current to the charging winding of the toroidally wound superconducting magnet, and a modulator operably connected to the DC power source and the charging winding, the modulator operable to modulate at least a portion of the DC current applied to the charging winding of the superconducting magnet. The energy is stored in a magnetic field of the superconducting magnet by applying the DC portion of the current to the charging winding of the superconducting magnet, and energy is withdrawn from the magnetic field by a current flowing in the discharging winding.

Also disclosed is a means of AC coupling between the charging winding and the discharging winding by use of a modulator, which modulates DC current thus converting it to AC by means of an oscillator, controlled by an input signal that selects the needed amplitude, frequency, and phase of the power to be coupled to the discharge winding. The AC power form is selectable and may be of any arbitrary form. The output current from the discharge winding is therefore AC current, which may be used as power grid input, or may also be converted back to DC via rectification and filtering, as desired by the application.

In addition to one or more of the features described above, or as an alternative, further embodiments of the SMES may include an AC load operably connected to the discharge winding.

In addition to one or more of the features described above, or as an alternative, further embodiments of the SMES may include that the AC load is at least one of a grid power system and a microgrid power system.

In addition to one or more of the features described above, or as an alternative, further embodiments of the SMES may include that the charging winding and the discharging winding each include a superconducting nanowire.

In addition to one or more of the features described above, or as an alternative, further embodiments of the SMES may include that the superconducting nanowire is composed on a multifilament cable exhibiting a diameter of less than one micron.

In addition to one or more of the features described above, or as an alternative, further embodiments of the SMES may include that the charging winding and discharging winding are wound on the toroidal magnet core in an alternating or interleaving manner to improve inductive coupling between the charging winding and discharging winding.

In addition to one or more of the features described above, or as an alternative, further embodiments of the SMES may include that the modulator is configured to provide modulation of the at least a portion of the DC current applied to the charging winding to cause the current flowing in the discharging winding to match a second AC load.

In addition to one or more of the features described above, or as an alternative, further embodiments of the SMES may include that the modulator is configured to provide modulation of the at least a portion of the DC current applied to the charging winding to cause the current flowing in the discharging winding to match a voltage, a frequency, and a phase of the second AC load.

In addition to one or more of the features described above, or as an alternative, further embodiments of the SMES may include that the modulator is configured to provide modulation of the at least a portion of the DC current applied to the charging winding to cause the current flowing in the discharging winding to match that of the AC load.

In addition to one or more of the features described above, or as an alternative, further embodiments of the SMES may include a connection switch configured to operably flow current from the DC power source to the modulator and SMES charging coil under charging selected conditions.

In addition to one or more of the features described above, or as an alternative, further embodiments of the SMES may include a bypass switch configured to operably flow current in the charging winding under bypass selected conditions and when the DC power source is not operably connected.

In addition to one or more of the features described above, or as an alternative, further embodiments of the SMES may include a second toroidally wound superconducting electromagnet having a second toroidal magnetic core, a second charging winding, and a second discharging winding, wherein the second charging winding and the second discharging winding are wound on the second toroidal magnetic core, and a second modulator operably connected to the DC power source operable to provide a second DC current to the second charging winding, the second modulator operable to modulate at least a portion of the second DC current applied to the second charging winding of the second toroidally wound superconducting electromagnet. The energy is stored in a magnetic field via the second superconducting magnet by applying a current to the second charging winding of the superconducting magnet, and energy is withdrawn from the magnetic field by a discharge current flowing in the discharging winding. The modulator is configured to provide modulation of the at least a portion of the DC current applied to the charging winding to cause the current flowing in the discharging winding to match a first phase of a multiphase AC load and the second modulator is configured to provide modulation of the at least a portion of the second DC current applied to the second charging winding to cause the current flowing in the second discharging winding to match a second phase of the multiphase AC load.

Also described herein in another embodiment is a method of storing and providing energy to an AC load using a superconducting magnetic energy storage system (SMES) having a superconducting magnet with a charging winding and a discharge winding wound on a toroidal magnetic core. The method includes receiving DC current from a DC power source, modulating at least a portion of the DC current to form a modulated charging current with a modulator operably connected to the DC power source, storing energy in the superconducting magnet by applying the DC charging current to a charging winding of the superconducting magnet under charging selected conditions, and discharging energy from the super conducting magnet by operably connecting the discharge winding to an AC load and flowing a load AC current to the AC load.

In addition to one or more of the features described above, or as an alternative, further embodiments of the method may include that the charging winding and the discharging winding each employ a superconducting nanowire, and the superconducting nanowire is composed on a multifilament cable exhibiting a diameter of less than one micron.

In addition to one or more of the features described above, or as an alternative, further embodiments of the method may include winding the charging winding and the discharging winding the toroidal magnet core in an alternating or interleaving manner to improve inductive coupling between the charging winding and discharging winding.

In addition to one or more of the features described above, or as an alternative, further embodiments of the method may include matching the current flowing in the discharging winding to the AC load by controlling the modulating of the at least a portion of the DC current in the charging winding.

In addition to one or more of the features described above, or as an alternative, further embodiments of the method may include that the modulating of the at least a portion of the DC current applied to the charging winding to cause the current flowing in the discharging winding to match a voltage, a frequency, and a phase of the AC load.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

FIG. 3E depicts the SMES system in a more complete dual winding configuration with modulation input in a discharging configuration in accordance with an embodiment.

DETAILED DESCRIPTION

A detailed description of one or more embodiments of the disclosed apparatus and method are presented herein by way of exemplification and not limitation with reference to the Figures.

The system and method disclosed herein have application in maintaining power quality against short term power or voltage reductions, in serving as a storage system in order to smooth peak loads, in providing an "uninterruptible" power supply in a grid or even in a supply system for an industrial process where power disturbances are very expensive and damaging, such as, for example, a paper mill or a steel mill. The system and method disclosed herein may also have application as an energy storage device in vehicles, including ships, airplanes, spacecraft, and other types of vehicles such as electric and hybrid electric/combustion powered cars, trucks and buses.

Figure 1:
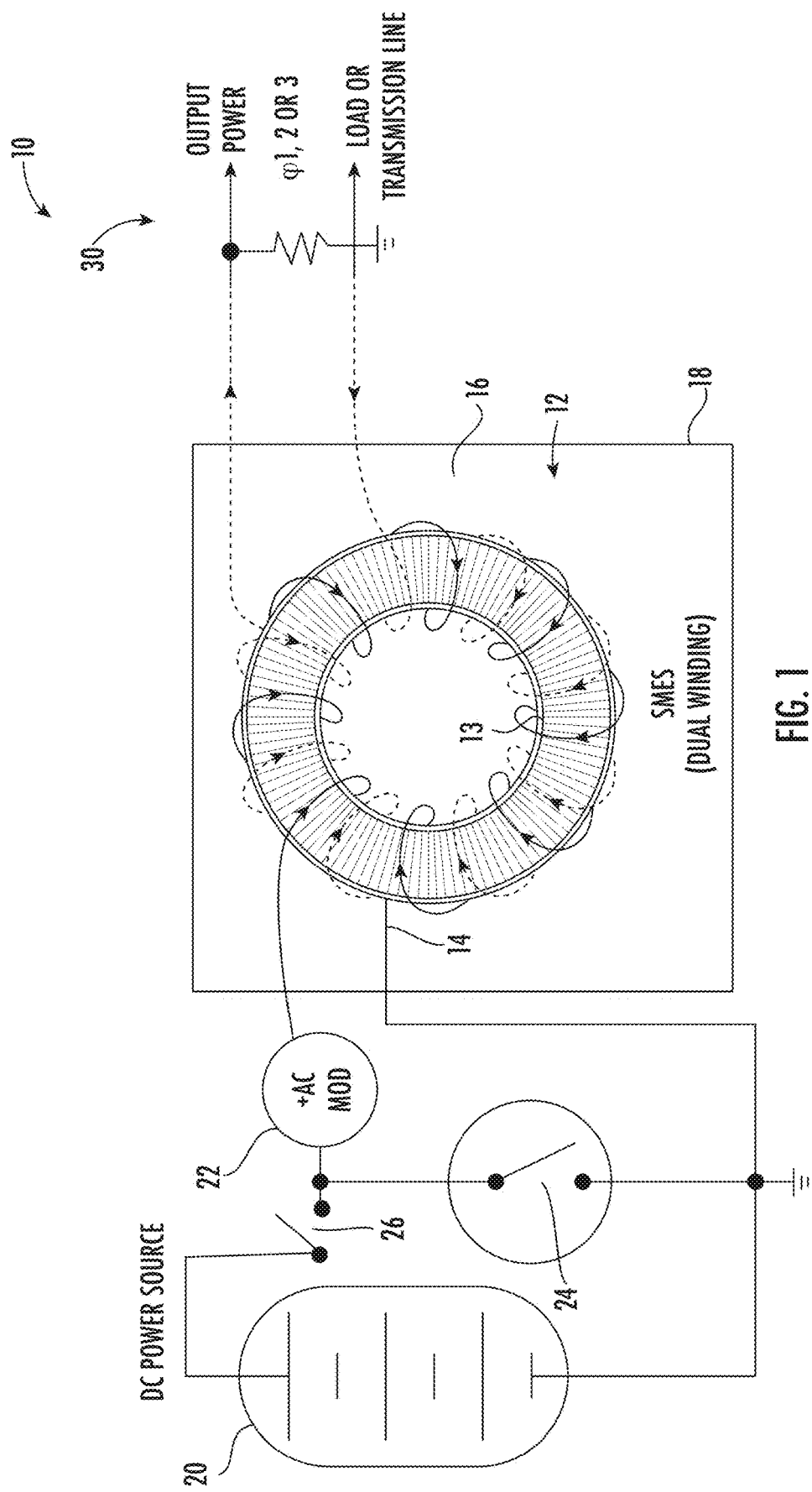
FIG. 1 is a simplified schematic diagram of a dual winding superconducting magnetic energy storage system (SMES) in accordance with an embodiment.
Figure 2:
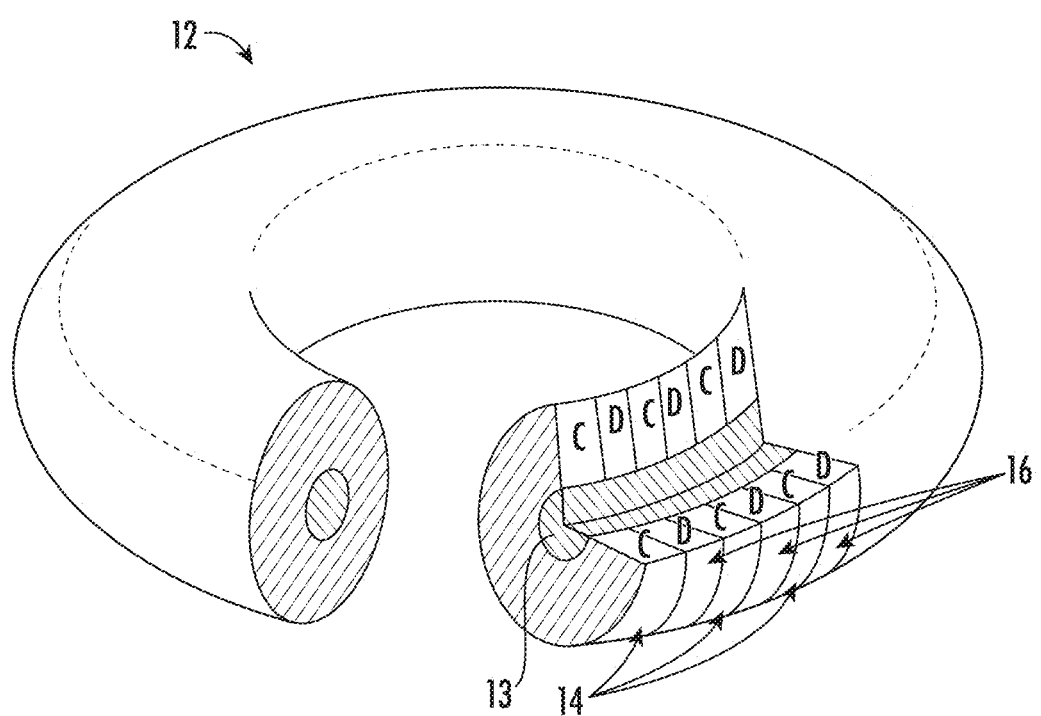
FIG. 2 is a depiction of a SMES electromagnet with a cutaway portion depicting the configuration of the dual windings on the toroidal core in accordance with an embodiment.

Referring to FIGS. 1 and 2, there is shown a toroidal Superconducting Energy Magnetic Storage (SMES) system 10 in accordance with the one embodiment. FIG. 1 depicts a simplified schematic diagram of a SMES, while FIG. 2 depicts a SMES magnet with a cutaway portion depicting the configuration of the windings on the toroidal core.

The SMES system 10 includes a superconducting toroidal electromagnet 12 having a first charging coil or winding 14 and a discharge coil or winding 16 wound on a high permeability core 13. The electromagnet 12 is cooled to superconducting temperatures by a cryogenic cooling system (partially shown as 18). In an embodiment, the electromagnet 12 is received in a container 18, e.g., a conventional dewar, containing liquid nitrogen at a temperature of 77° K for use with high temperature superconductors such as YBCO. Alternatively, a suitable container 18 or enclosure for containment and circulation of helium (or other coolant) in a gas, liquid or gas/liquid mixture may be used. The cooling system provides for cooling to temperatures between 40° K and 20° K or less, and, in this manner may accommodate lower temperature superconductors. Alternatively a refrigeration system may also be added to replace the use of cryogens, powered by a portion of the output current. Alternatively should room temperature superconductors be developed they may be used without the need for a dewar.

A power source 20 is connected to a charging coil 14 of the SMES device 10 via an alternating current (AC) modulator 22. In addition, a modulator 22 is operably connected in series with the power source 20 to provide modulation of the current provided by the power source 20. In an embodiment, the modulator 22 includes a control function, the control function operable to monitor operating characteristics of the load, including, but not limited to, the voltage, current and frequency of the power at the AC load 30 and configure the modulation of the charging current to cause the discharging current for the discharging winding 16 to match the operating characteristics of the power at the AC load 30. In an embodiment the power source 20 may be a large DC source such as an intermittent renewable source. For example, a solar farm with photovoltaic panels coupled to the SMES device 10, a wind farm generation system with rectified power, and the like with power outputs on the order of several megawatts and current capabilities on the order of at least 200 amperes. Bypass switch 24 is employed to facilitate storage and discharge when not charging the SMES device 10, while disconnection switches 26 can be employed to bypass the SMES device 10 as needed to facilitate maintenance if needed but are not required.

The first or charging coil 14 is employed for charging and thereby storing energy on the SMES device 10 is wound around the toroidal magnet core 13, and is inductively coupled to it. The second or discharging coil 16 is also wound about the toroidal magnet core 13 and is also inductively coupled to the core 13. The second coil 16 is wound on the core 13 and configured to provide tight inductive coupling between the first coil 14 and the second coil 16. In an embodiment, the first coil 14 and the second coil 16 are wound in an intermingled or interleaving manner as is commonly known to ensure tight coupling as depicted in FIG. 2. In an embodiment, the magnet 12 is toroidal and the first coil 14 and the second coil 16 are wound distributed substantially evenly around the entire circumference of the toroidal magnet core 13, such that the magnetic field generated thereby is substantially contained within the bore of the magnet 12. Advantageously, with a toroidal electromagnet 12, the external magnetic field is very low (theoretically zero, except for leads and winding irregularities). Energy is stored in toroidal magnet 12 by a flow of current in the charging coil 14, while energy is discharged from the magnet 12 by the flow of current in the discharge coil 16. Advantageously, by employing separate charging coils 14 and discharge coils 16, energy can be stored and discharged from the electromagnet 12 simultaneously. More specifically, an irregular or varying power input may readily be smoothed or load leveled so that the output power is more uniform. The advantage is readily borne out in applications such as green energy applications including solar, wind where source energy can vary significantly by day, weather, and the like.

In an embodiment, the charging winding 14 and the discharging winding 16 are fabricated employing superconducting nanowire filament cables. The superconducting nanowire filaments facilitate scaling up of current SMES technology to the dual winding configuration of the described embodiments. In one embodiment, the nanowires are comprised of 19 nanofilaments to form a cable 1 micron in diameter. The extremely small diameter of the wire coupled with a large toroidal core 13 facilitated generating magnetic fields of much higher strength for a given size than previously achieved, and therefore of much higher energy density. In another embodiment, the nanowires may be smaller and composed of fewer nanofilaments, and may be used to scale down SMES devices to very small sizes, as needed to replace for instance Lithium Ion or Silver Oxide batteries as energy storage devices. In another variation of these embodiments, the nanofilament and nanowire superconducting materials may be of a slow quench type, resulting in a slower release of stored energy during a quench event, reducing the risk of fire and resulting in much improved product safety.

Continuing with FIGS. 1 and 2, in an embodiment, the second or discharge coil 16 is operably connected to a load shown generally as 30 and configured to provide power thereto. The load 30 may be a grid power connection, microgrid, and the like. In an embodiment, advantageously, no separate grid converter to ensure synchronization and load matching is needed. The AC modulator 22 connected to the first or charging winding 14 is configured to adjust the modulation such that the energy coupled to the discharge winding 16 and thereby provided to the load 30 on the discharge winding 16 is appropriately synchronized and matched to the load 30. In an embodiment, the grid power at the load 30 may be monitored and employed for synchronization and matching. In another embodiment an optional separate converter/inverter may be employed.

Figure 3A:
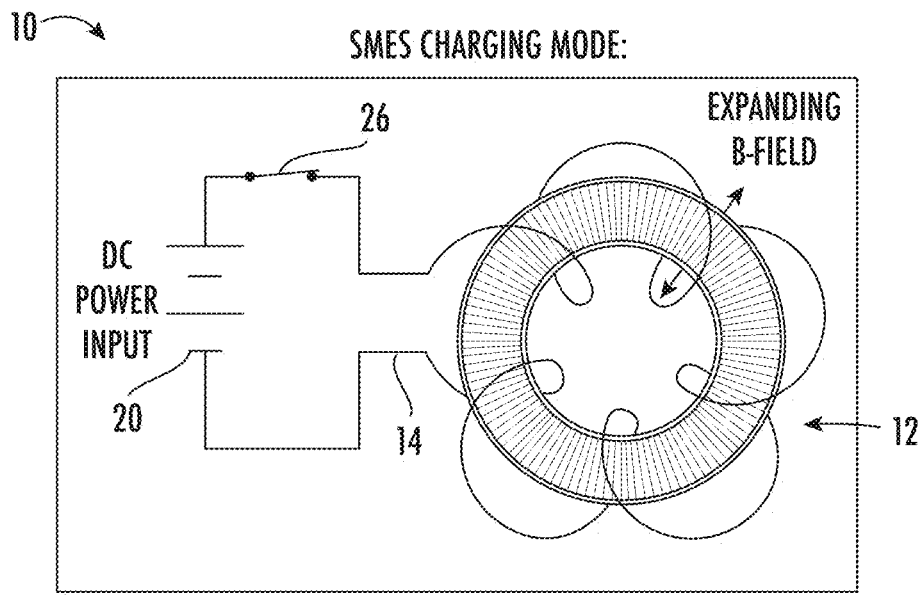
FIG. 3A depicts a simple electrical schematic diagram depicting a simplified configuration of a single winding toroidal SMES electromagnet when charging from a DC power source similar to the charging winding as described herein.
Figure 3A:
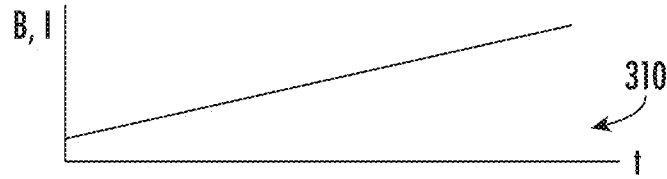
Figure 3B:
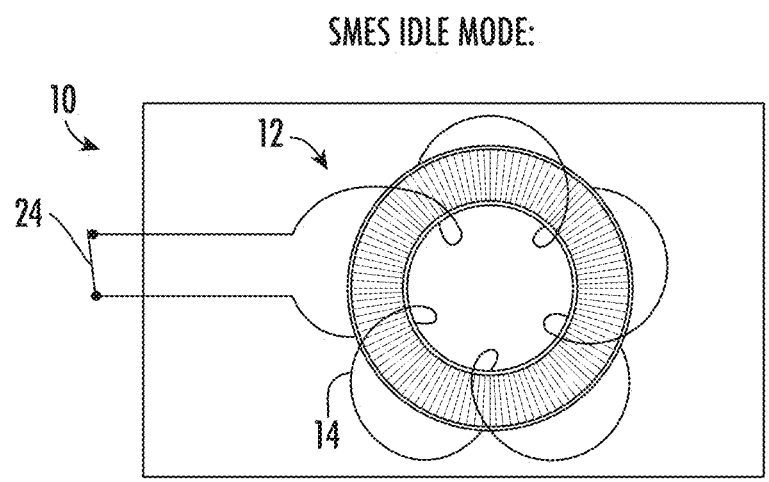
FIG. 3B depicts the simple electrical schematic diagram depicting a simplified configuration of a single winding toroidal SMES electromagnet when bypassed and not charging from a DC power source similar to the charging winding as described herein.
Figure 3B:
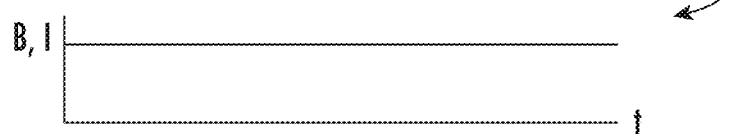

Referring to FIGS. 3A-3E depicting operation of a simplified SMES 10 to facilitate understanding of the operation the SMES 10 device. FIG. 3A depicts a simple electrical schematic diagram depicting a simplified configuration of the charging winding e.g., 14 of a toroidal SMES unit 10 when charging from a DC power source, e.g. power source 20 for the purposes of illustration. As depicted in the Graph 310, a time history of the as current is applied to the first or charging winding 14, building of the magnetic field and current in the SMES electromagnet 12. It should be noted that the magnetic field B and current $I_{CHARGE}$ gradually increases as energy is magnetically stored in the electromagnet 12. Similarly, FIG. 3B depicts an instance where the source connection switch 26 is opened isolating the power source 20 (such as at night for a solar power source) and bypass switch 24 is closed to continue circulation of a current in the charging winding 14. By the superconducting nature of the SMES electromagnet 12, the current $I_{CHARGE}$ and magnetic field B remain substantially constant as depicted at graph 320. Graph 320 depicts the time history of the as charging coil 14 is bypassed and current $I_{CHARGE}$ is circulating in the first or charging winding 14.

Figure 3C:
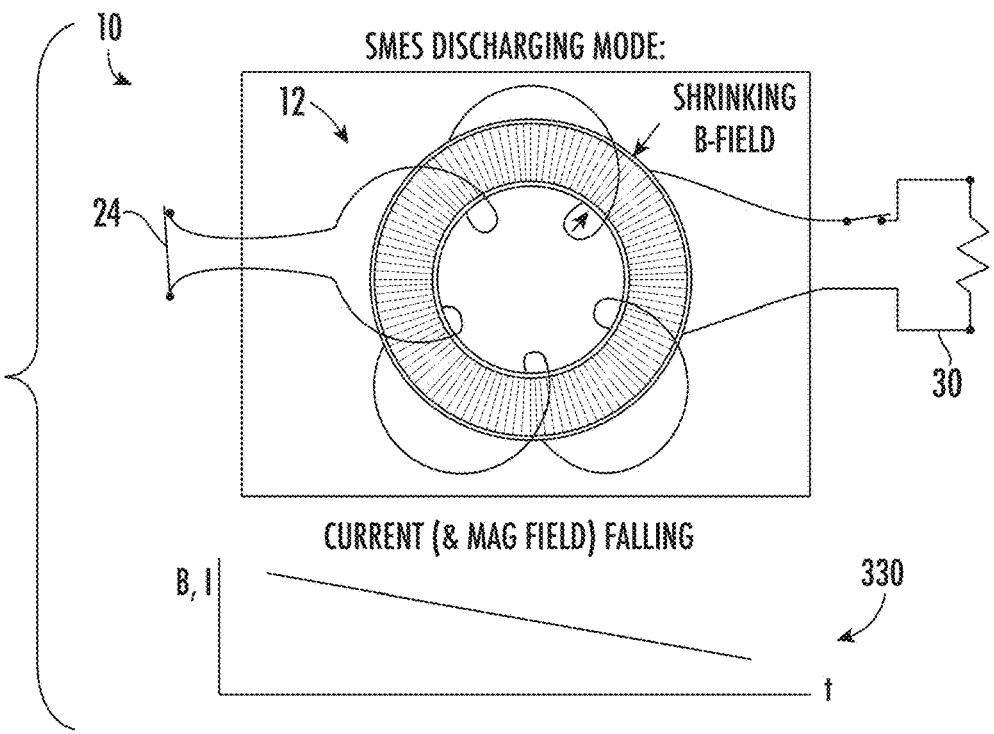
FIG. 3C depicts the simplified instance where a single winding SMES electromagnet is discharging to supply a load.

FIG. 3C depicts the simplified example provided for the purpose of illustration, where a single winding SMES electromagnet 12 is discharged and the energy stored in the SMES electromagnet 12 is then operably connected to and employed to supply a load 30. In this instance, magnetic energy stored in the SMES electromagnet 12 is utilized to direct a current $I_{DISCHARGE}$ (it is a different current than the charging current) from the charging winding 14 of SMES electromagnet 12 to the load 30 causing the current $I_{DISCHARGE}$ and magnetic field B to decay as the SMES electromagnet 12 is discharged as depicted in graph 330. It should be appreciated, that in this simplified example, the connections switch is opened to disconnect the power source 20 from the SMES electromagnet 12 and the stored energy is dissipated. Similarly, in this instance, a load switch (not shown) connecting the charging winding 14 to the load 30 is employed, which is not the case for the dual winding SMES electromagnet of the described embodiments.

Figure 3D:
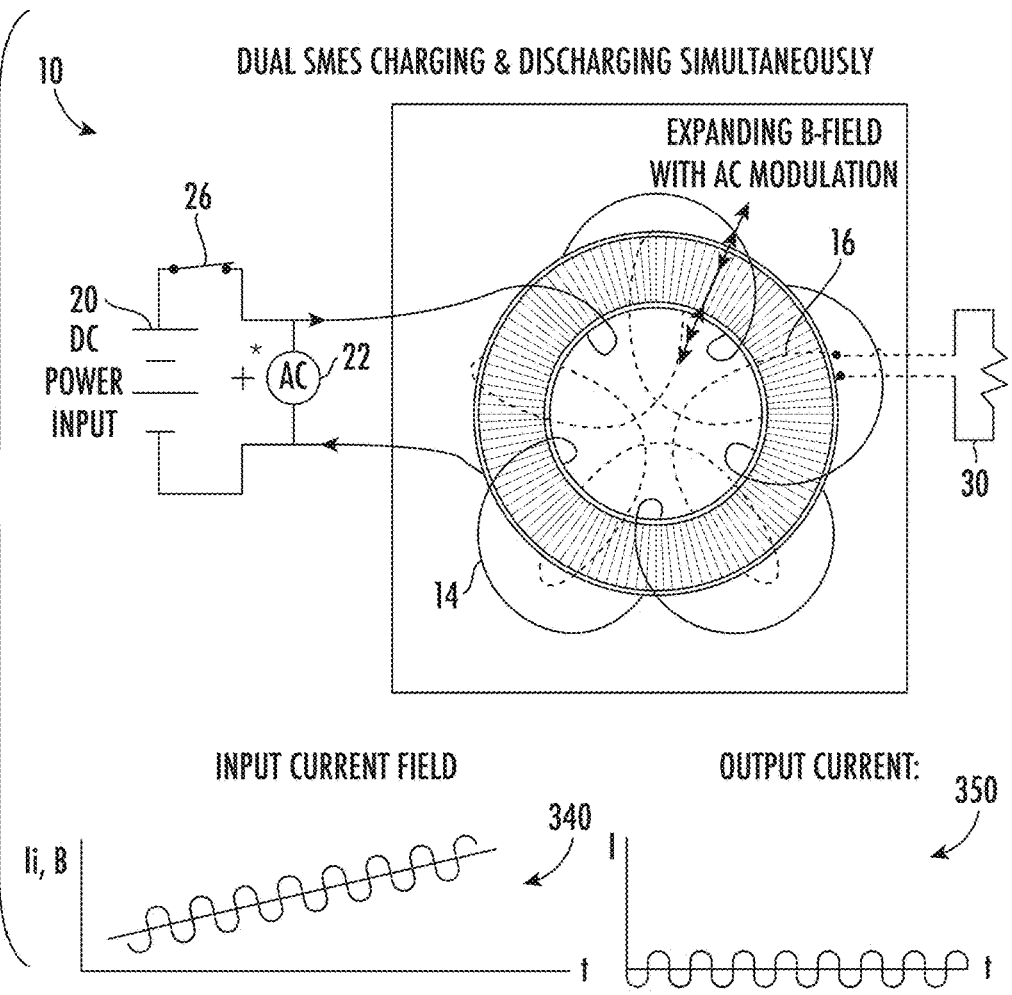
FIG. 3D depicts a more complete dual winding SMES system with modulation input and allowing both charging and discharging simultaneously, in one configuration, in accordance with an embodiment.

Continuing with FIG. 3D, which depicts the more complete dual winding SMES system 10 with AC modulation applied by the modulator 22 (FIG. 1) and the load 30 also connected to illustrate the operation of the described embodiments. In this instance, uniquely the SMES device 12 is both charging to increase the magnetic energy storage, and discharging depleting the stored magnetic energy simultaneously in accordance with the described embodiments. That is, in operation, connection switch 26 is closed, connecting the DC power source 20 and providing a charging current denoted $I_{CHARGE}$ with an AC current $I_{AC}$ superimposed on the DC charging current $I_{DC}$ in the charging winding 14 as depicted in graph 340. Likewise, the load 30 is also connected to the discharge winding 16 where the AC energy is magnetically and inductively coupled to the discharge winding 16 and presented to the load 30 as depicted in graph 350. In this instance, providing an alternating current $I_{DISCHARGEAC}$ to thereby discharge the SMES electromagnet 12 to supply energy for the load 30. It should be appreciated that balancing the magnitude and frequency of the AC modulation from the modulator 22 enables controlling the amount of energy that can be discharged and thereby supplied to the load 30. In this configuration the SMES electromagnet 12 operates to couple the AC energy from the charging winding 14 to the discharge winding 16 similar to a transformer.

Finally, turning to FIG. 3E, which depicts the SMES system 10 after being charged from the DC power source 20, and the power source 20 is disconnected to illustrate the operation of the described embodiments. In this instance, with no charging from the power source 20, and AC modulation applied and the bypass switching device 24 is closed to circulate currents in the charging winding 14 in accordance with the described embodiments. In this embodiment, uniquely the SMES electromagnet 12 is discharging depleting the stored magnetic energy as current is supplied to the load. That is, in operation, switch 24 (FIG. 1) is closed, to facilitate circulating the charging current denoted $I_{PRIMARY}$ with a AC current $I_{AC}$ superimposed on the DC current $I_{DC}$ circulating in the charging winding 14 as depicted in graph 360. Likewise, the load 30 is also connected to the discharge winding 16 where the AC energy is magnetically and inductively coupled to the discharge winding 16 and presented to the load 30 as depicted in graph 360. In this instance, providing an alternating current $I_{DISCHARGEAC}$ corresponding to an AC current supplied to the load 30 as depicted by graph 370. It should be noted that as depicted in graph 360, as the SMES electromagnet 12 to supply energy via the discharge winding 16 to the load 30 as depicted by graph 370, the energy in the SMES electromagnet 12 is depleted. Under these conditions, the magnetic field B and the current $I_{PRIMARY}$ in the charging winding 14 of the SMES electromagnet 12 is steadily depleted. It should be appreciated that balancing the magnitude and frequency of the AC modulation from the modulator 22 enables the energy at a desired voltage, current and frequency can be supplied to the load 30 for a selected duration.

Figure 4:
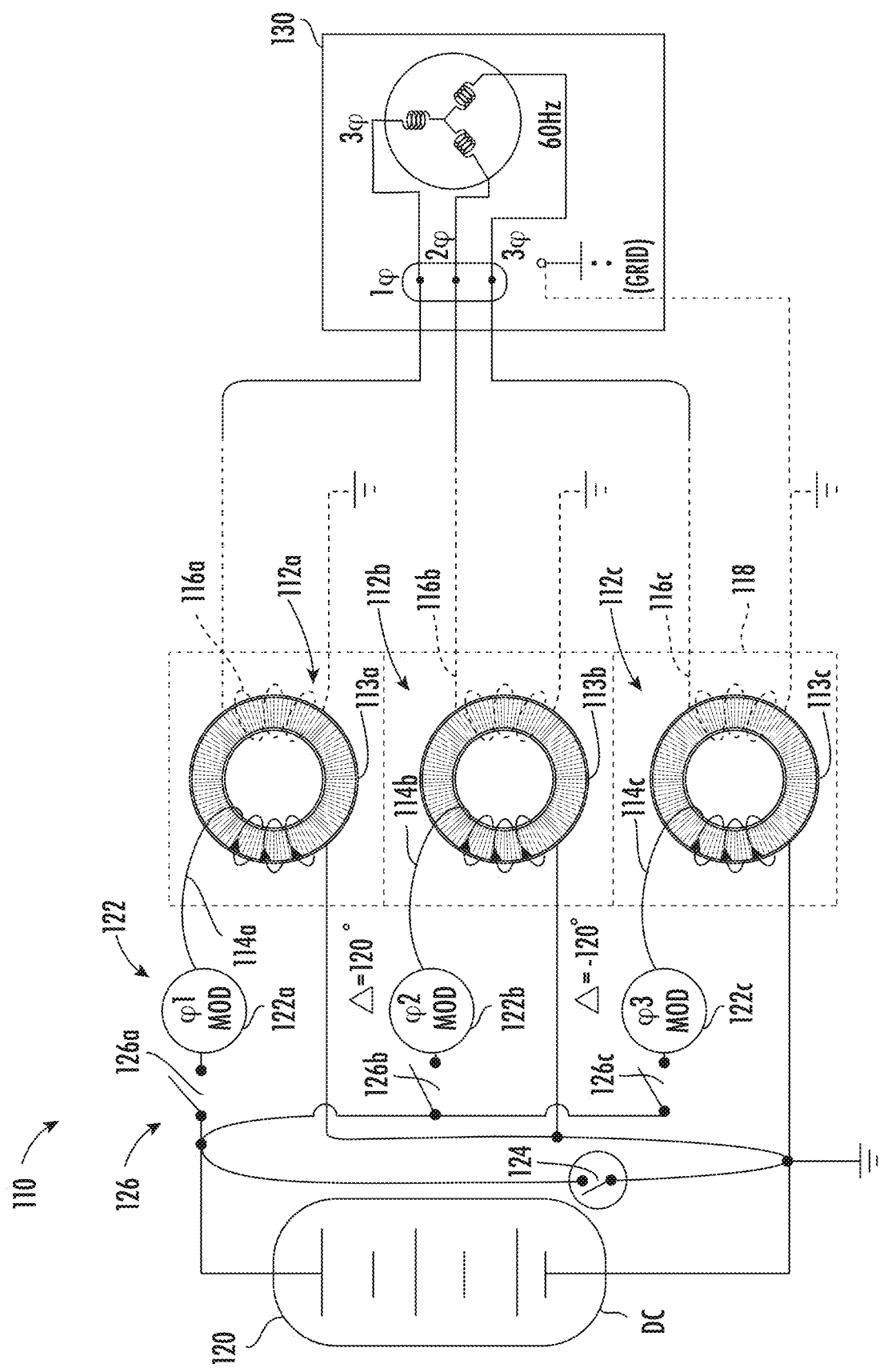
FIG. 4 depicts a multiphase SMES system in accordance with an embodiment.

FIG. 4 depicts an example of a SMES system 110 as may be employed for a multiphase application in accordance with an embodiment. The multiphase SMES system 10 includes a plurality of superconducting toroidal magnets shown generally as 112 and more specifically as 112a, 112b, and 112c associated with a single phase application known generally as phases A, B, and C respectively. Each of the magnets 112 having a first charging coil shown generally as 114 and more specifically as 114a, 114b, and 114c. Likewise the magnets 112 also have discharge coil(s) 116 denoted as 116a, 116b, and 116c wound on a high permeability cores 113 denoted 113a, 113b, and 113c respectively. As described earlier herein, the magnet(s) 112 are cooled to superconducting temperatures by cryogenic cooling system (partially shown). In an embodiment, the magnet(s) 112 is received in a container 118, e.g. a conventional dewar, containing liquid nitrogen at a temperature of 77° K as described previously herein. In other embodiments refrigeration is powered by a portion of the output power, replacing the need for cryogen. In still other embodiments various room temperature superconductors may be used to eliminate the need for dewars.

A power source 120 is connected to a charging coil(s) 114 (e.g., 114a, 114b, 114c) of the SMES electromagnets 112 (112a, 112b, 112c) via an alternating current (AC) modulators shown generally as 122 and specifically as 122a, 122b, and 122c respectively. In addition, the modulator(s) 122 is operably connected in series with the power source 120 to provide modulation of the current sourced by the power source 120 to each of the magnets 112a, 112b, and 112c respectively. In an embodiment, as described herein, the power source 120 may be a large DC source such as an intermittent renewable source. Bypass switch 124 are employed to bypass the SMES device 10 as needed to facilitate maintenance and maintain circulation of currents in the charging coils 114a, 114b, 114c respectively. Disconnection switches shown generally as 126 and more specifically as 126a, 126b, and 126c provide for connection of the power source 120 to the charging coils 114a, 114b, and 114c. In an embodiment, the AC modulation provided by the modulator(s) 122 may be advantageously held steady for a steady output from the discharge winding(s) 116a, 116b, and 116c respectively.

The SMES magnets 112a, 112b, and 112c are wound and constructed as described herein. Once again, energy is stored in toroidal magnet 112a, 112b, and 112c by a flow of current in the charging coils 114a, 114b, and 114c, while energy is discharged from the magnets 112 by the flow of current in the discharge coils 116a, 116b, and 116c respectively.

Continuing with FIG. 4, in an embodiment, the second or discharge coils 116a, 116b, and 116c operably connected to a three phase load 130 and configured to provide power thereto. The load 130 may be a three phase grid power connection, microgrid, and the like. In an embodiment, advantageously, no separate grid converter to ensure synchronization and load matching is needed. The AC modulators 122a, 122b, and 122c connected to each of the charging windings 114a, 114b, and 114c respectively and configured to adjust the modulation amplitude, frequency and phases such that the energy coupled to the discharge windings 116a, 116b, and 116c and thereby provided to the load 130 is appropriately synchronized and matched to the load 130 (e.g., the power grid). In an embodiment, a phase shift of ±120 electrical degrees for the B phase discharge winding 116b and C phase discharge winding 116c. In an embodiment, the grid power at the load 130 may be monitored and employed for synchronization and matching. In an embodiment a single modulator for each of the three charging windings 114a, 114b, 114c may be employed. In another embodiment an optional separate converter/modulator may be employed.

Figure 5:
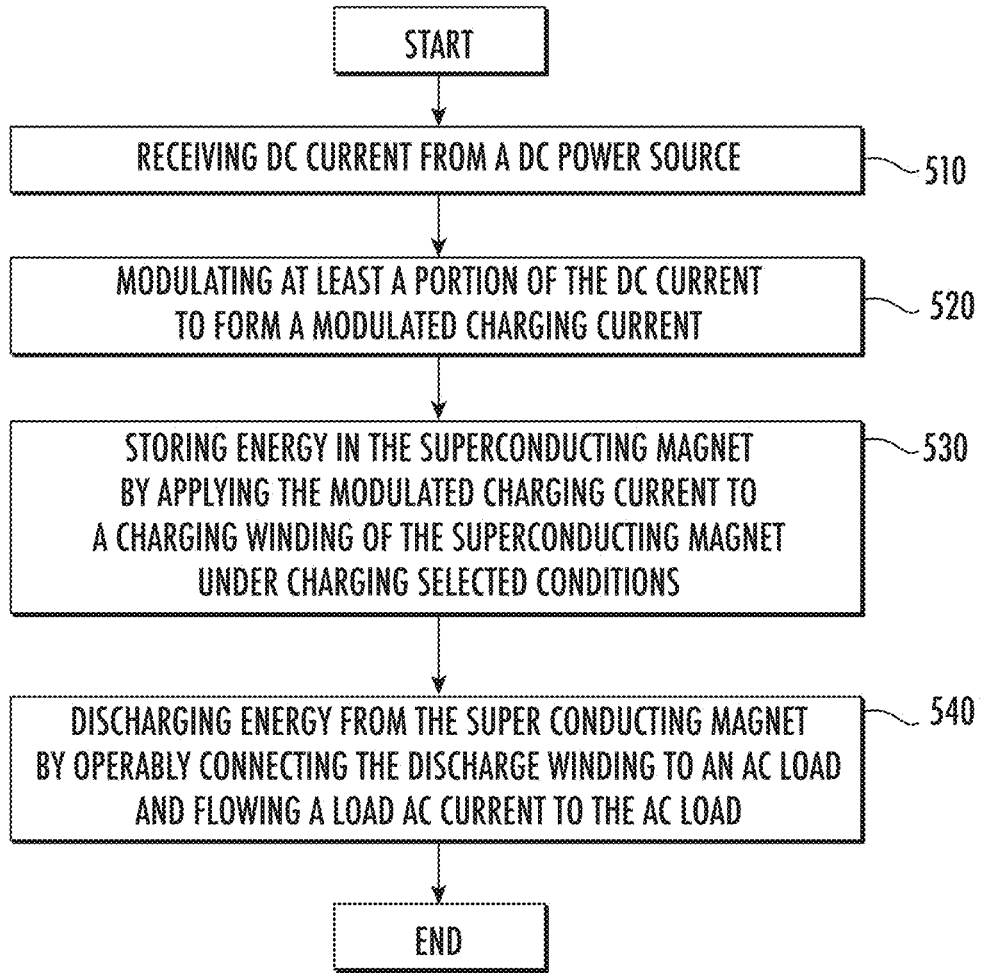
FIG. 5 depicts a flowchart of a method of storing energy in a SMES system in accordance with an embodiment.

FIG. 5 is a flowchart of a method 500 of storing and retrieving energy in a SMES device 10 in accordance with an embodiment. The method 500 initiates at process step 510 where the a SMES electromagnet 12 having separated charging winding 14 and discharge winding 16 is operably connected to a DC power source 20 and receiving DC current from the DC power source. At process step 520 at least a portion of the DC current from the DC power source 20 is modulated. The modulation may include an AC signal configured to facilitate inductive coupling in the SMES electromagnet 12 between the primary winding 14 and the discharge winding 16. At process step 530 the method 500 includes applying the modulated charging current to the charging winding 14 of the SMES electromagnet 12 under selected conditions. Finally, under selected conditions at process step 540 the discharge winding is operably connected to an AC load and the energy from the SMES electromagnet 12 is dissipated by an AC current flowing to the AC load. The method may also optionally includes synchronizing the modulation to the AC voltage, frequency and phase of an AC load 30.

There are several potential applications of the disclosed SMES. It can be shown that the energy stored per unit mass in a magnet, in a flywheel, and in a compressed gas depends primarily on the ratio of allowable stress to density of the structural material and that the energy density of the magnet, flywheel and gas sphere are comparable, and that both will have less energy density than some embodiments of the disclosed SMES. Furthermore, the magnet requires no moving parts in charging or extracting the stored energy. Thus the toroidal SMES can best be used for short, intense bursts of power. Superconducting magnets are best used for millisecond to second discharge times. Needs shorter than a millisecond can be served by capacitors while those longer than a minute can be served by batteries. There are also versions of SMES with much higher energy density than can be stored by chemical batteries. SMES can therefore be practical replacements for chemical batteries.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A superconducting magnetic energy storage system (SMES), the SMES comprising:
   a toroidally wound super conducting magnet having a toroidal magnetic core;
   a charging winding;
   a discharging winding wherein the charging winding and discharging winding are wound on the toroidal magnetic core;
   a DC power source, the DC power source operable to provide DC current to the charging winding of the toroidally wound superconducting magnet; and
   a modulator operably connected to the DC power source and the charging winding, the modulator operable to modulate at least a portion of the DC current applied to the charging winding of the superconducting magnet; and wherein energy is stored in a magnetic field of the superconducting magnet by applying a current to the charging winding, and energy is withdrawn from the magnetic field by a current flowing in the discharging winding.

2. The SMES of claim 1, further including an AC load operably connected to the discharge winding.

3. The SMES of claim 2, wherein the AC load is at least one of a grid power system and a microgrid power system.

4. The SMES of claim 2, wherein the charging winding and discharging winding are wound on the toroidal magnet core in an alternating or interleaving manner to improve inductive coupling between the charging winding and discharging winding.

5. The SMES of claim 2, wherein the modulator is configured to provide modulation of the at least a portion of the DC current applied to the charging winding to cause the current flowing in the discharging winding to match that of the AC load.

6. The SMES of claim 1, wherein the charging winding and the discharging winding each include a superconducting nanowire.

7. The SMES of claim 6, wherein the superconducting nanowire is composed on a multifilament cable exhibiting a diameter of less than one micron.

8. The SMES of claim 1, wherein the modulator is configured to provide modulation of the at least a portion of the DC current applied to the charging winding to cause the current flowing in the discharging winding to match a second AC load.

9. The SMES of claim 8, wherein the modulator is configured to provide modulation of the at least a portion of the DC current applied to the charging winding to cause the current flowing in the discharging winding to match a voltage, a frequency, and a phase of the second AC load.

10. The SMES of claim 1, further including a connection switch configured to operably flow current from the DC power source to the modulator under charging selected conditions.

11. The SMES of claim 1, further including a bypass switch configured to operably flow current in the charging winding under bypass selected conditions and when the DC power source is not operably connected.

12. The SMES of claim 1, further including:
a second toroidally wound super conducting magnet having a second toroidal magnetic core, a second charging winding, and a second discharging winding, wherein the second charging winding and the second discharging winding are wound on the second toroidal magnetic core;
a second modulator operably connected to the DC power source operable to provide a second DC current to the second charging winding, the second modulator operable to modulate at least a portion of the second DC current applied to the second charging winding of the second toroidally wound superconducting magnet;
wherein energy is stored in a magnetic field of the second superconducting magnet by applying a current to the second charging winding of the superconducting magnet, and energy is withdrawn from the magnetic field by a discharge current flowing in the discharging winding;
wherein the modulator is configured to provide modulation of the at least a portion of the DC current applied to the charging winding to cause the current flowing in the discharging winding to match a first phase of a multiphase AC load and the second modulator is configured to provide modulation of the at least a portion of the second DC current applied to the second charging winding to cause the current flowing in the second discharging winding to match a second phase of the multiphase AC load.

13. The method of claim 12, further including disconnection the DC power source and bypassing the charging winding to operably flow current in the charging winding under bypass selected conditions.

* * * * *